United States Patent
Nakano et al.

(10) Patent No.: US 10,600,135 B2
(45) Date of Patent: Mar. 24, 2020

(54) ENERGY MANAGEMENT SYSTEM, METHOD, AND DEVICE FOR MULTI-SITE ENERGY MANAGEMENT

(71) Applicant: Hitachi, Ltd., Chiyoda-ku, Tokyo (JP)

(72) Inventors: Michiki Nakano, Tokyo (JP); Susumu Ikeda, Tokyo (JP); Yu Ikemoto, Tokyo (JP); Takashi Fukumoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 218 days.

(21) Appl. No.: 15/577,063

(22) PCT Filed: Mar. 22, 2016

(86) PCT No.: PCT/JP2016/059052
§ 371 (c)(1),
(2) Date: Nov. 27, 2017

(87) PCT Pub. No.: WO2016/189938
PCT Pub. Date: Dec. 1, 2016

(65) Prior Publication Data
US 2018/0165773 A1 Jun. 14, 2018

(30) Foreign Application Priority Data
May 28, 2015 (JP) .................................. 2015-108162

(51) Int. Cl.
*G06Q 50/06* (2012.01)
*H02J 3/14* (2006.01)
(Continued)

(52) U.S. Cl.
CPC ........... *G06Q 50/06* (2013.01); *G05B 13/026* (2013.01); *G06Q 10/06312* (2013.01);
(Continued)

(58) Field of Classification Search
None
See application file for complete search history.

(56) References Cited

U.S. PATENT DOCUMENTS 9,960,637 B2 * 5/2018 Sanders ................. H02J 3/381
2008/0236177 A1 * 10/2008 Senba ..................... F24F 11/30
62/157

(Continued)

FOREIGN PATENT DOCUMENTS

EP      2 685 417 A1    1/2014
JP      2014-023389 A   2/2014
(Continued)

OTHER PUBLICATIONS

International Search Report with English Translation and Written Opinion issued in corresponding application No. PCT/JP2016/059052 dated Jun. 14, 2016.

(Continued)

*Primary Examiner* — Mohammad Ali
*Assistant Examiner* — Kelvin Booker
(74) *Attorney, Agent, or Firm* — Foley & Lardner LLP

(57) ABSTRACT

To minimize the amount of calculation for changing an operation schedule even when there is an increase in the number of sites. A management computer calculates a first total schedule value, which is the total of the schedule values for each of the sites within a first time frame. If the first total schedule value exceeds a first target value set in advance, the management computer: calculates a first excess amount of the first total schedule value in relation to the first target value; selects, as a first site, a site subjected to a change in a demand schedule from a group of candidate sites satisfying a candidate criterion set in advance from among a plurality of the sites, the selection being performed on the basis of information on the facility characteristics for each of the sites; changes a first demand schedule of the first site in the (Continued)

first time frame; and transmits the changed first demand schedule to a control device of the first site.

13 Claims, 14 Drawing Sheets

(51) Int. Cl.
    *H02J 3/38*     (2006.01)
    *G05B 13/02*     (2006.01)
    *G06Q 10/06*     (2012.01)
    *H02J 3/00*     (2006.01)
    *H02J 13/00*     (2006.01)

(52) U.S. Cl.
    CPC .......... *G06Q 10/06315* (2013.01); *H02J 3/00* (2013.01); *H02J 3/14* (2013.01); *H02J 3/38* (2013.01); *H02J 13/00* (2013.01); *H02J 13/0017* (2013.01); *H02J 2003/007* (2013.01); *Y02B 70/3225* (2013.01); *Y02E 60/76* (2013.01); *Y04S 20/222* (2013.01); *Y04S 40/22* (2013.01)

(56) References Cited

U.S. PATENT DOCUMENTS

| | | | |
|---|---|---|---|
| 2011/0046792 A1* | 2/2011 | Imes | F24F 11/63 700/278 |
| 2012/0244869 A1* | 9/2012 | Song | H04W 52/0206 455/449 |
| 2013/0103622 A1* | 4/2013 | Matsuoka | H04L 12/2825 706/12 |
| 2013/0274928 A1* | 10/2013 | Matsuoka | G05D 23/1904 700/276 |
| 2014/0020244 A1* | 1/2014 | Carlson | H01L 31/02021 29/825 |
| 2014/0025213 A1 | 1/2014 | Otsuki et al. | |
| 2014/0025215 A1* | 1/2014 | Carlson | H02J 3/383 700/292 |
| 2014/0316581 A1* | 10/2014 | Fadell | G05D 23/1904 700/276 |
| 2016/0124411 A1* | 5/2016 | Tinnakornsrisuphap | G05B 19/0428 700/291 |
| 2016/0209858 A1* | 7/2016 | Ellice-Flint | G06Q 50/06 |
| 2016/0275081 A1* | 9/2016 | Tian | G06Q 30/0631 |
| 2017/0207633 A1* | 7/2017 | Nakayama | H04W 4/80 |
| 2017/0331287 A1* | 11/2017 | Kopp | G06Q 10/06312 |

FOREIGN PATENT DOCUMENTS

| | | |
|---|---|---|
| JP | 2014-230337 A | 12/2014 |
| JP | 2015-203879 A | 11/2015 |

OTHER PUBLICATIONS

Extended European Search Report issued in corresponding application No. 16 79 9646 dated May 22, 2018.

* cited by examiner

[Fig. 1]
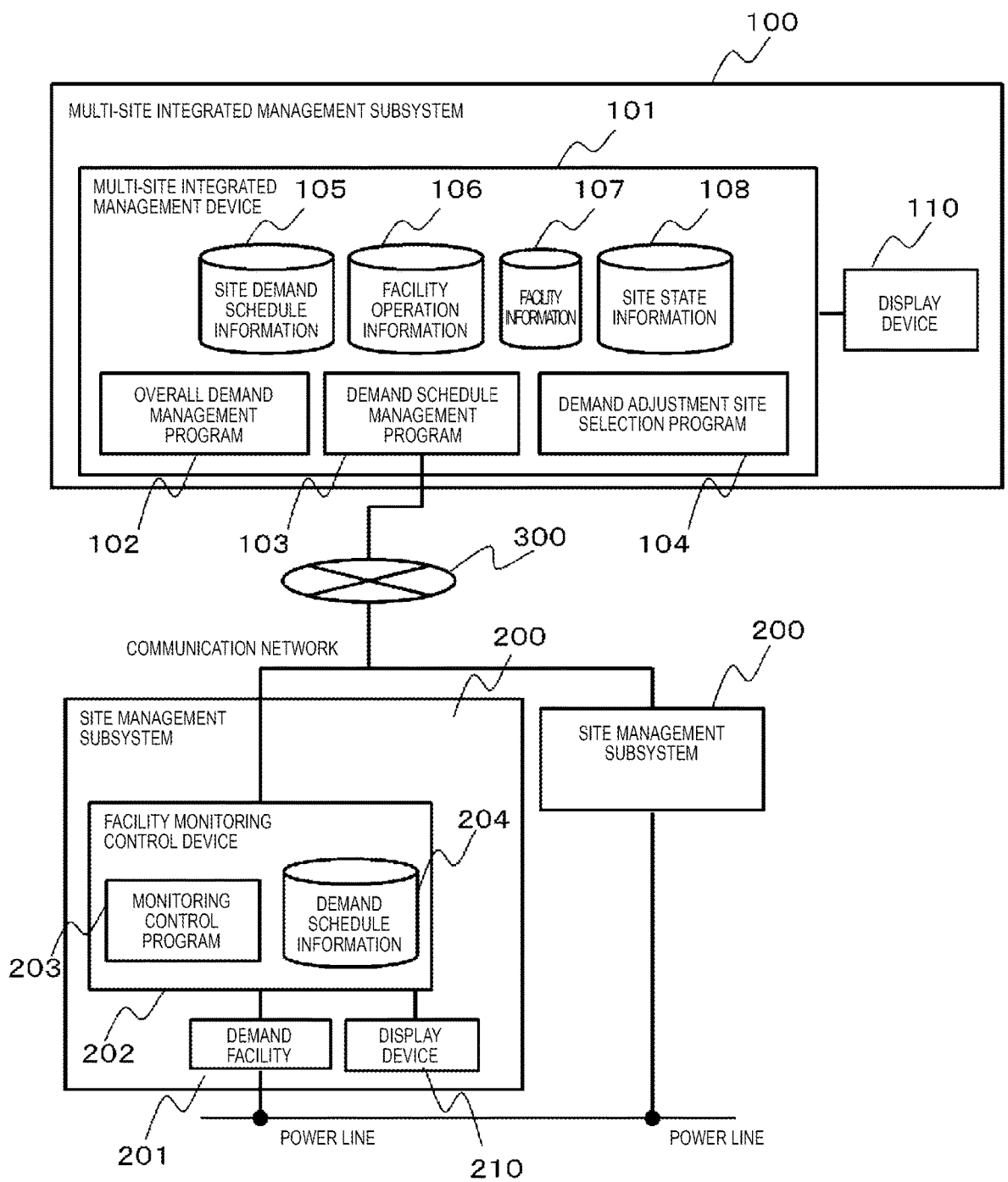

[Fig. 2]
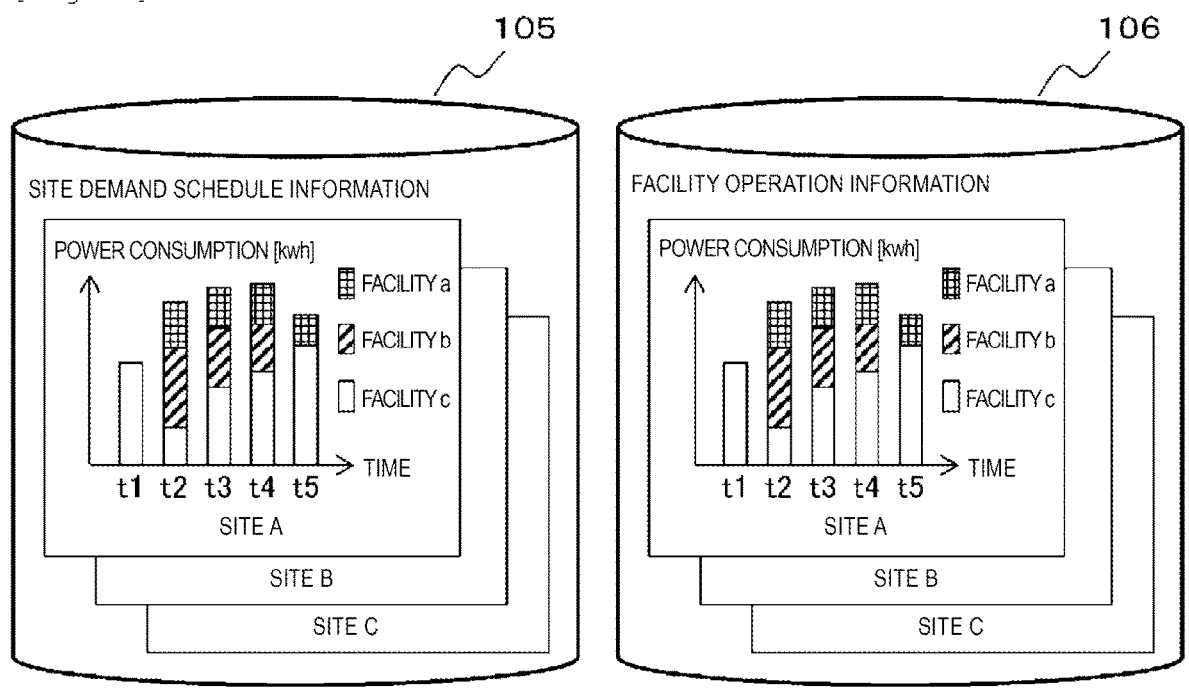
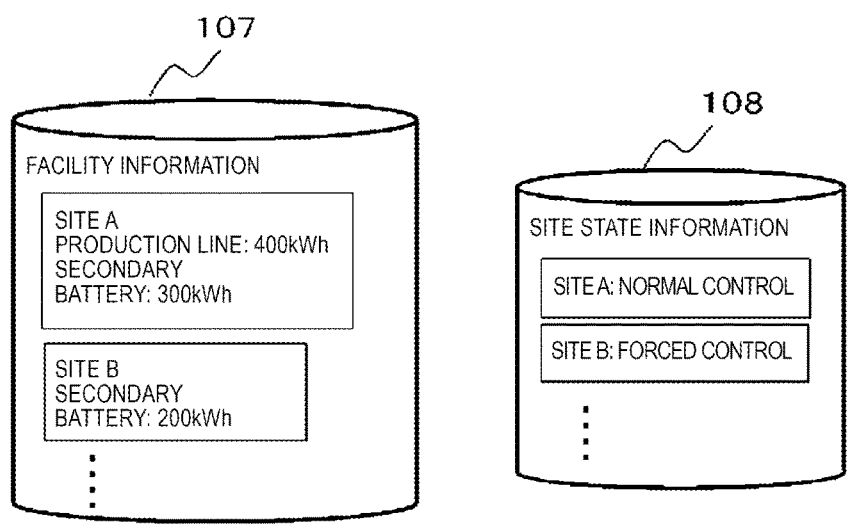

[Fig. 3]
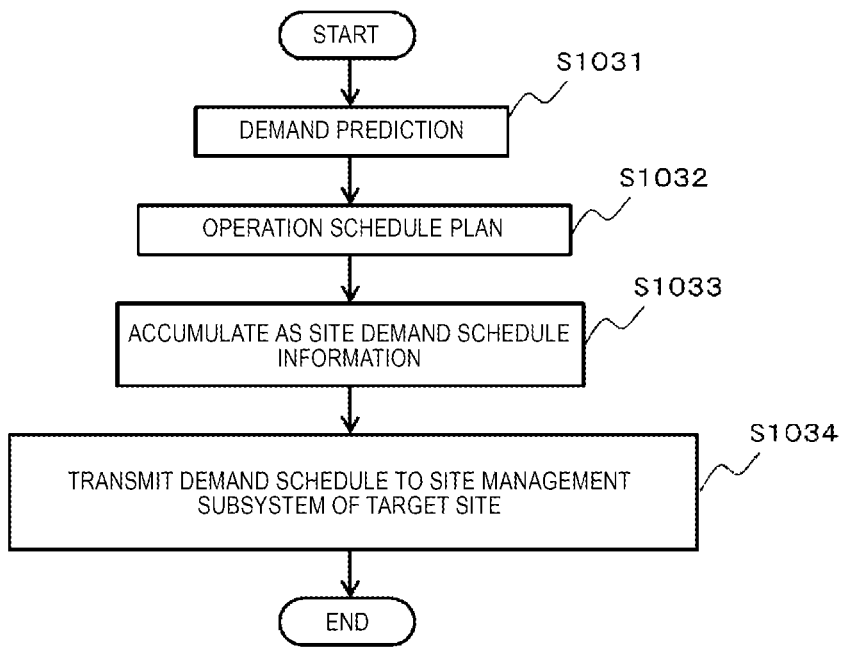
[Fig. 4]
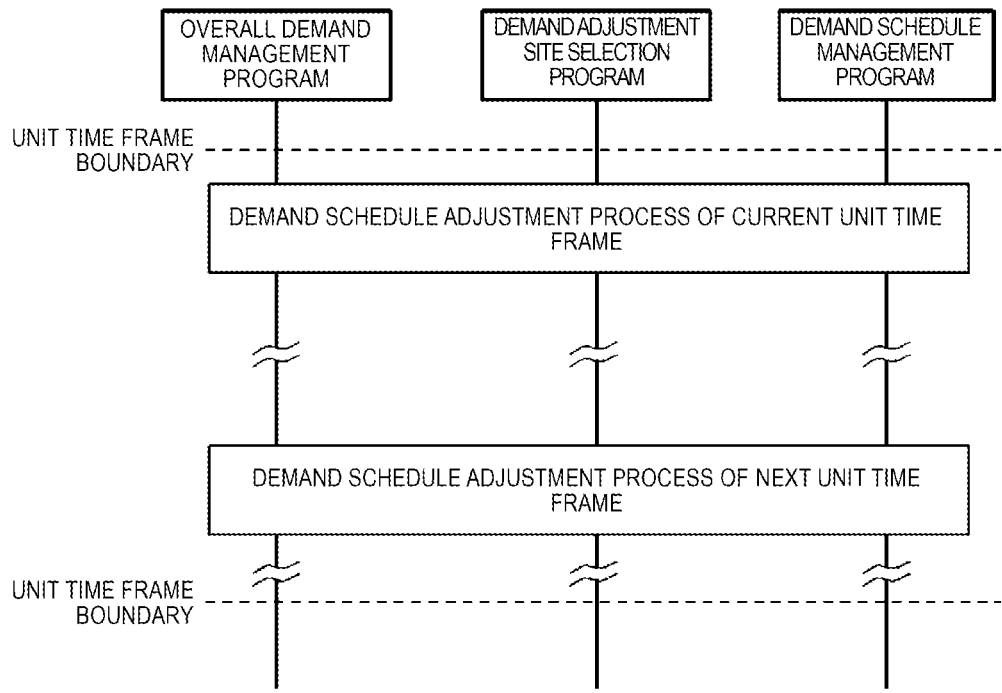

[Fig. 5]
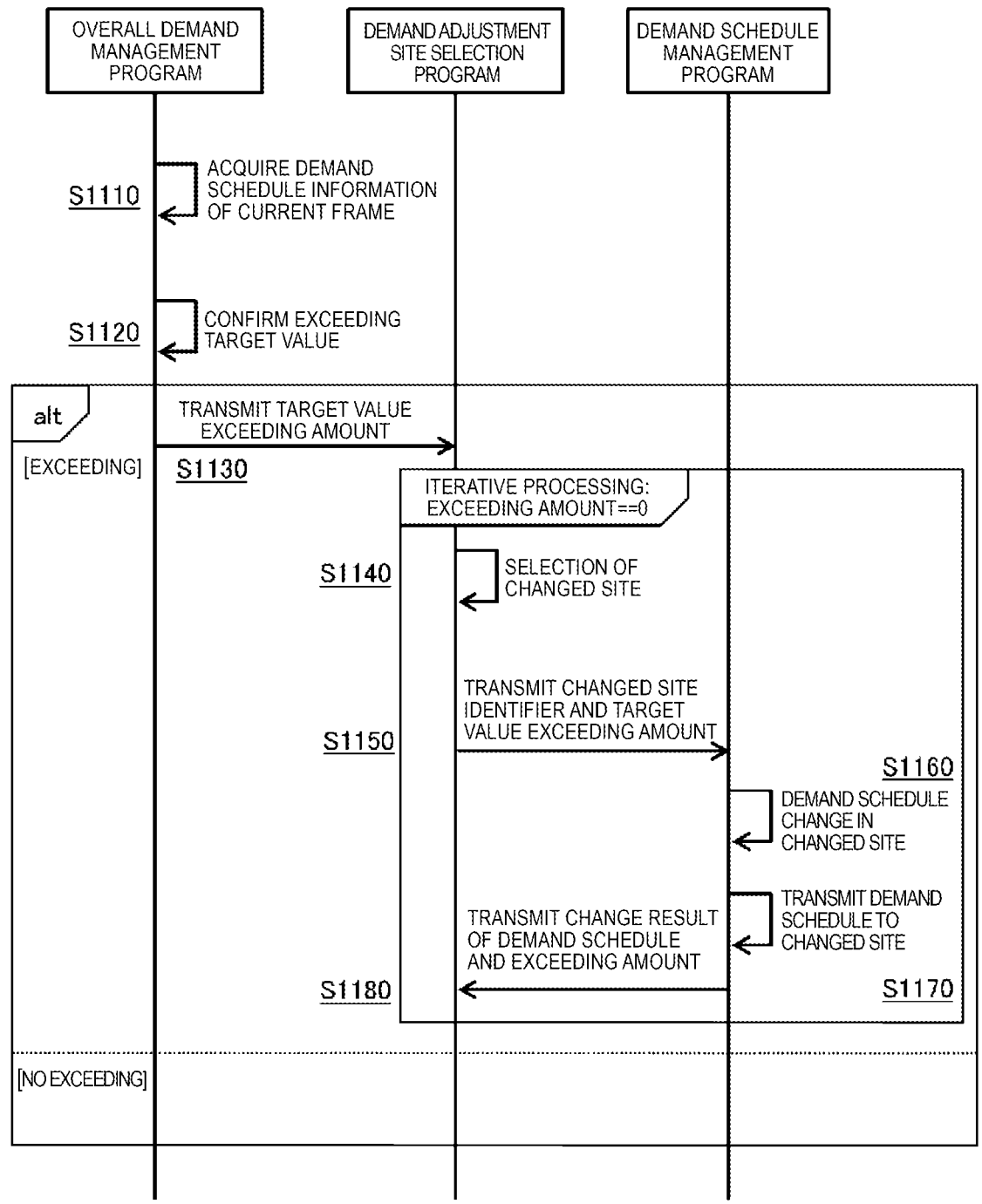

[Fig. 6]
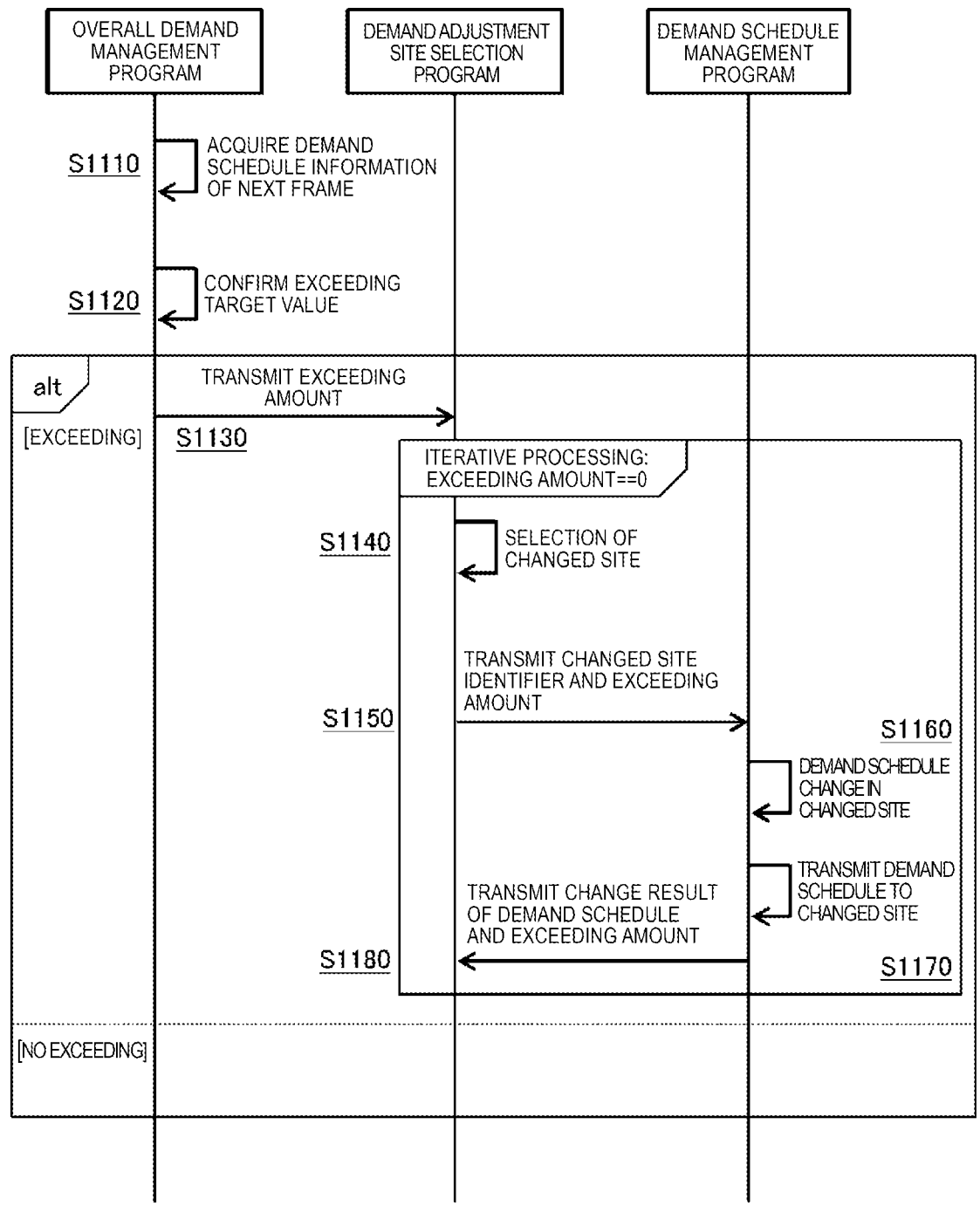

[Fig. 7]
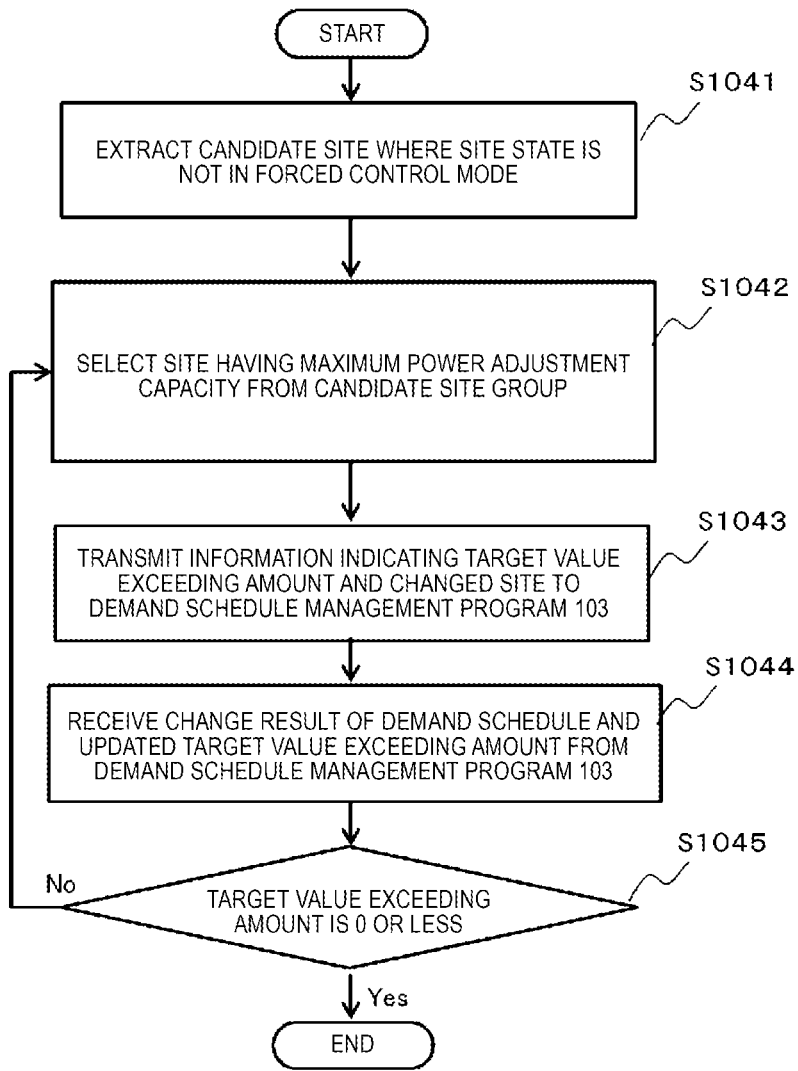
[Fig. 8]
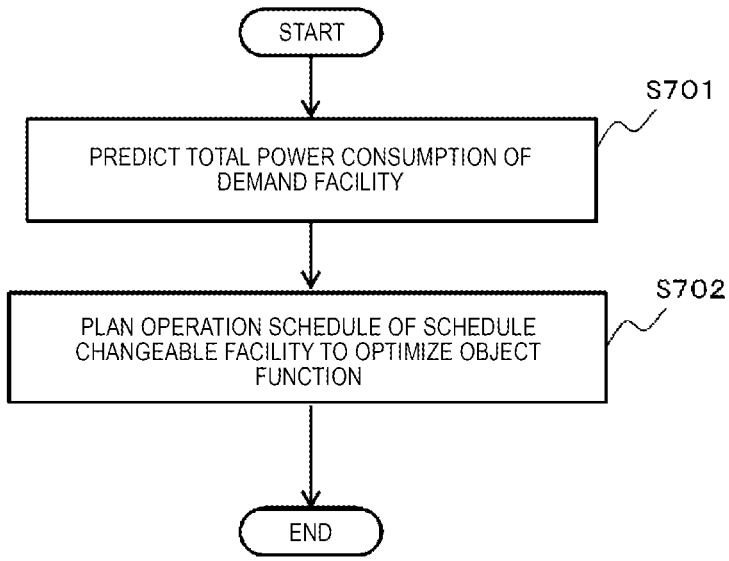

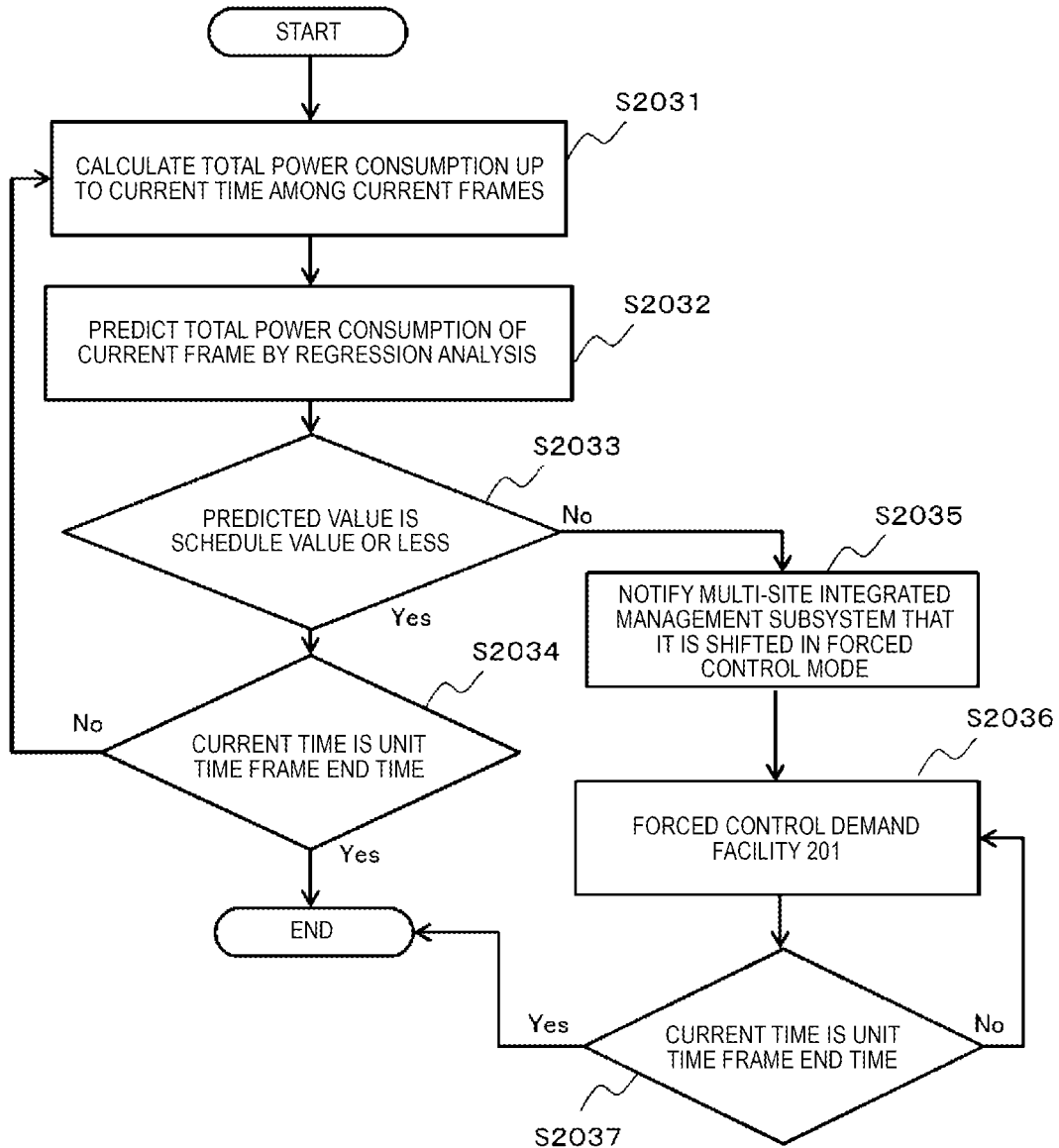
[Fig. 9]

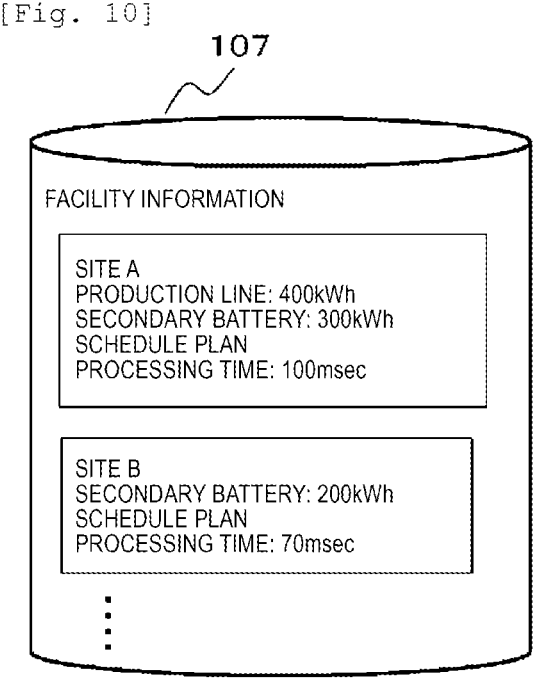
[Fig. 10]

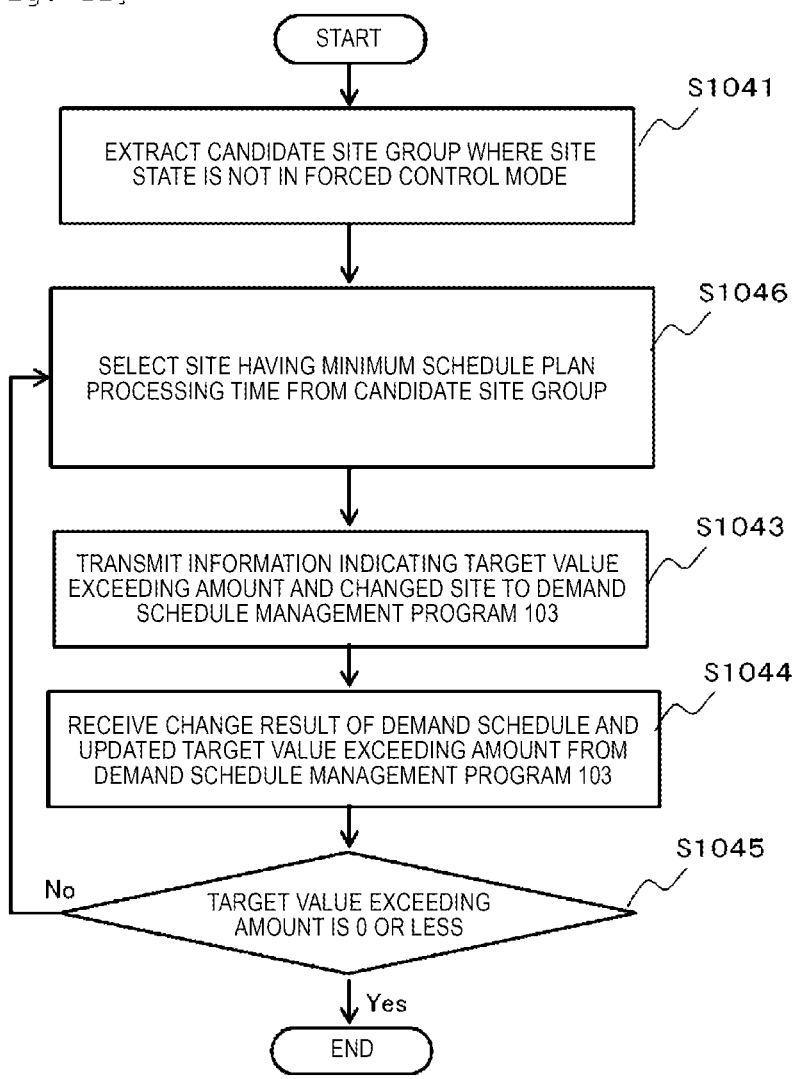

[Fig. 12]
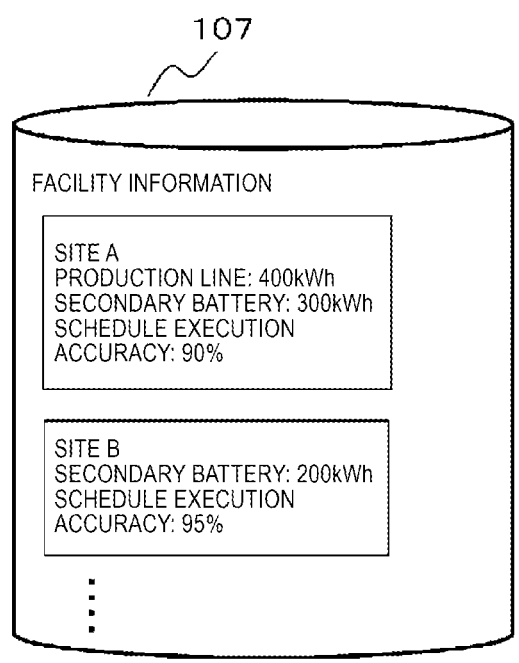

[Fig. 13]
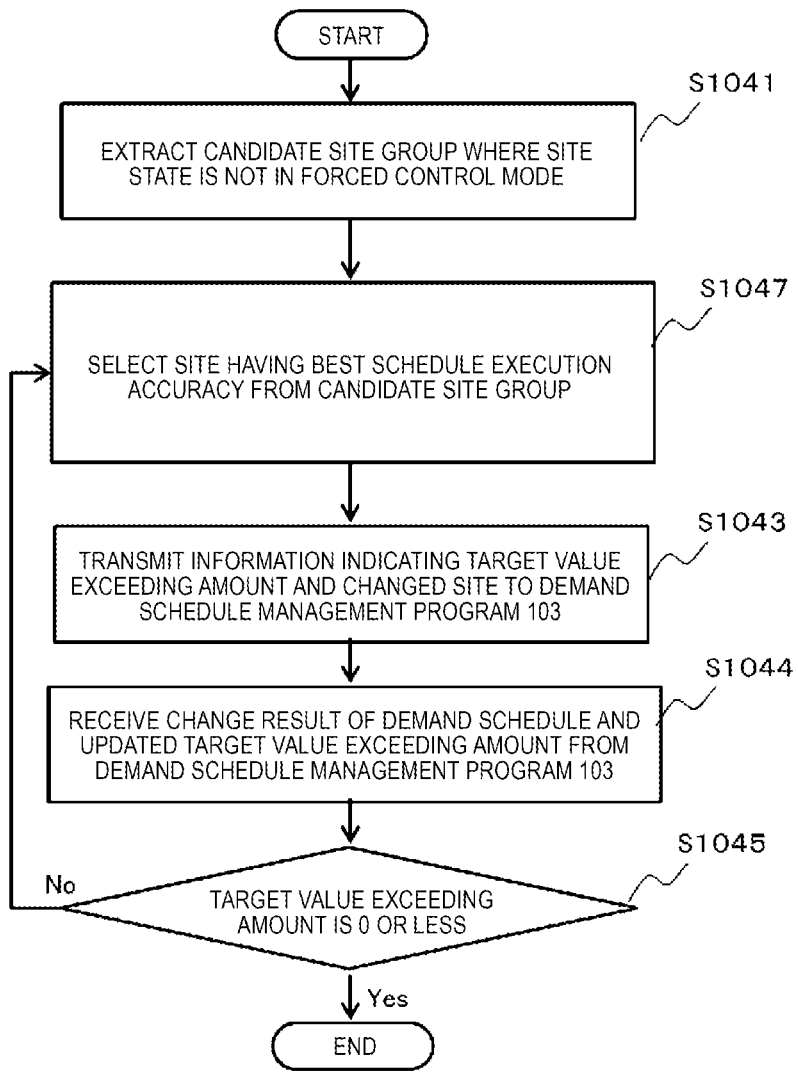

[Fig. 14]
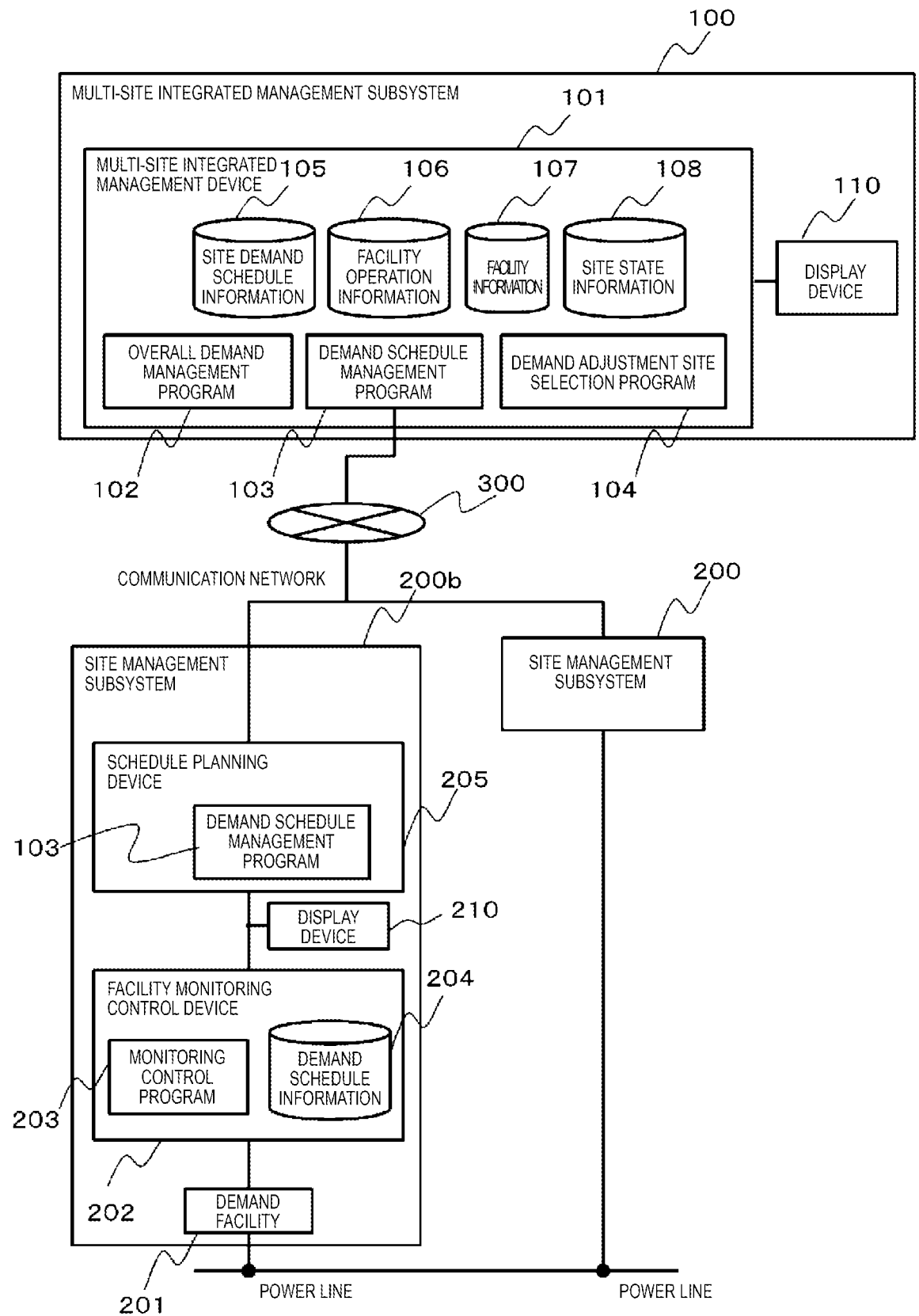

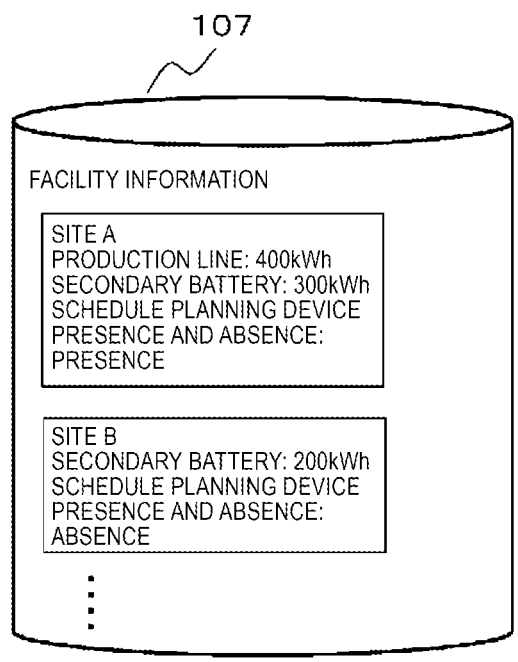
[Fig. 15]

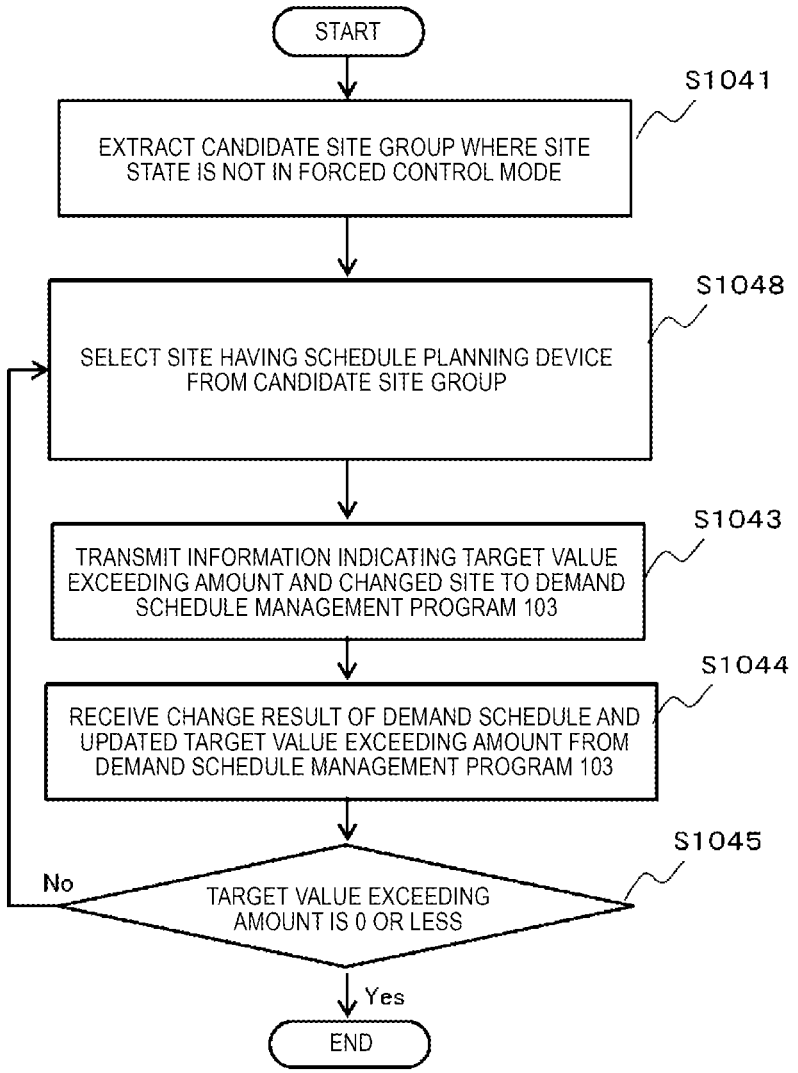

ENERGY MANAGEMENT SYSTEM, METHOD, AND DEVICE FOR MULTI-SITE ENERGY MANAGEMENT

TECHNICAL FIELD

The present invention relates to an energy management system.

BACKGROUND ART

In an energy management system that manages the energy consumption of a plurality of sites including factories and buildings, in order to be able to generate an operation schedule for each of sites, a technique described in PTL 1 is known.

PTL 1 describes that "in order to optimize a first evaluation value and optimize a second evaluation value satisfying the optimization of the first evaluation value, in generating an operation schedule for performing a control of integrated demand power of a plurality of facilities, it is possible to optimize both the first evaluation value and the second evaluation value easily and quickly compared with a case where the optimization is collectively performed on the first evaluation value and the second evaluation value".

CITATION LIST

Patent Literature

PTL 1: JP-A-2014-230337

SUMMARY OF INVENTION

Technical Problem

As in the above-described technique, in a case of optimizing a plurality of sites as a whole, when the number of sites is increased, an amount of calculation for generating an operation schedule increases. Accordingly, the energy management system may not be able to complete the calculation and may not be able to achieve the same amount of time for each predetermined period.

Solution to Problem

In order to solve the above problem, the energy management system that is an aspect of the present invention includes a management computer and a plurality of control devices which are provided at a plurality of sites, respectively, and connected to the management computer via a communication network. The management computer stores information on facility characteristics which is provided at the site and indicates characteristics of a facility group that demands energy, a result value of a past demand energy amount of the facility group, and a demand schedule including a schedule value of the demand energy amount of the facility group for each time frame of a preset length, for each of sites. The management computer calculates a first total schedule value, which is the total of the schedule values for each of the sites within a first time frame, if the first total schedule value exceeds a first target value set in advance, calculates a first excess amount of the first total schedule value in relation to the first target value, selects, as a first site, a site subjected to a change in a demand schedule from a group of candidate sites satisfying a candidate criterion set in advance from among a plurality of the sites, the selection being performed on the basis of information on the facility characteristics for each of the sites, changes a first demand schedule of the first site within the first time frame, and transmits the changed first demand schedule to a control device of the first site. The control device for each of sites stores the demand schedule of the site within the first time frame and controls a facility group within the site on the basis of the demand schedule of the site in the first time frame, in the first time frame.

Advantageous Effects of Invention

It is possible to minimize the amount of calculation for changing an operation schedule even when there is an increase in the number of sites.

BRIEF DESCRIPTION OF DRAWINGS

FIG. 1 illustrates a configuration of a multi-site integrated energy management system.
FIG. 2 illustrates information stored in a multi-site integrated management device 101.
FIG. 3 illustrates a demand schedule management process by a demand schedule management program 103.
FIG. 4 illustrates an outline of an adjustment process within a unit time frame.
FIG. 5 illustrates a current frame adjustment process.
FIG. 6 illustrates a next frame adjustment process.
FIG. 7 illustrates a demand adjustment site selection process by a demand adjustment site selection program 104.
FIG. 8 illustrates a demand schedule changing process.
FIG. 9 illustrates a power consumption monitoring process by a monitoring control program 203.
FIG. 10 illustrates an example of facility information 107 in Example 2.
FIG. 11 illustrates a demand schedule changing site selection process in Example 2.
FIG. 12 illustrates an example of the facility information 107 in Example 3.
FIG. 13 illustrates the demand schedule changing site selection process in Example 3.
FIG. 14 illustrates a configuration of the multi-site integrated energy management system in Example 4.
FIG. 15 illustrates an example of the facility information 107 in Example 4.
FIG. 16 illustrates the demand schedule changing site selection process in Example 4.

DESCRIPTION OF EMBODIMENTS

Hereinafter, embodiments of the invention will be described with reference to drawings.

Example 1

In this example, a multi-site integrated energy management system (an energy management system) that manages electric energy of a plurality of sites will be described.

FIG. 1 illustrates a configuration of a multi-site integrated energy management system.

The multi-site integrated energy management system includes a multi-site integrated management subsystem 100 and a plurality of site management subsystems 200. The multi-site integrated management subsystem 100 accumulates information on power consumption and owned facilities for each of sites and manages a total power consumption of entire sites. The multi-site integrated management subsystem 100 may be disposed in a data center or the like as a cloud. The site management subsystem 200, which is installed at a site such as buildings and factories, monitors and controls owned facilities for each of sites and transmits information on an operation situation to the multi-site integrated management subsystem 100. The multi-site integrated management subsystem 100 and the site management subsystem 200 are connected to each other via a communication network 300.

The multi-site integrated energy management system manages the operation schedule of the facility for each of sites so as to achieve the same amount at the same time in a unit time set in advance. For example, in a case where the unit time is 30 minutes, regarding the amount of power consumption in a time zone every 30 minutes such as a time zone from 11 o'clock to 11:30, or a time zone from 11:30 to 12 o'clock, the multi-site integrated energy management system executes planning of the operation schedule, confirmation of excess of the target value, and the like. Hereinafter, each time zone to be managed such as from 11 o'clock to 11:30, from 11:30 to 12 o'clock, is described as a unit time frame (a time frame). That is, the multi-site integrated energy management system is required for satisfying the same amount of time within the unit time frame. Specifically, the multi-site integrated energy management system performs adjusting demand and supply such that the total of the power consumption of overall sites within the unit time frame coincides with the total of the power consumption of entire sites within the unit time frame. For example, the multi-site integrated energy management system can reduce the electricity fee on condition that the same amount of time is reached, and pay penalty unless it can achieve the same amount of time.

The multi-site integrated management subsystem 100 includes a multi-site integrated management device 101 (a management computer and an energy management device). The multi-site integrated management device 101 is, for example, a computer, and includes a memory storing a program and data, and a processor for executing a process according to the program.

The multi-site integrated management device 101 stores site demand schedule information 105 that is information on a schedule value of the power consumption for each unit time frame of each site, facility operation information 106 that is information on a result value of the power consumption actually consumed by the facility for each unit time frame of each site, facility information (information on facility characteristics) 107 that is information on characteristics of the facility owned by each site, and site state information 108 that is information on a control mode of a demand facility 201 owned by each site. Identifiers are given to each site in advance. The demand facility 201 may include a power source such as a storage battery or a generator.

The multi-site integrated management subsystem 100 further includes an overall demand management program 102 that extracts demand schedule information (demand schedule) of each of sites from the site demand schedule information 105, calculates overall total energy consumption for each unit time frame, and manages differences from a target value of the overall total energy consumption, a demand schedule management program 103 that manages demand schedule information including the schedule value of the power consumption amount of each site and the operation schedule of the facility, and a demand adjustment site selection program 104 that selects a site where the demand schedule information is changed in a case where the overall total energy consumption exceeds the target value.

The multi-site integrated management subsystem 100 may include a display device 110 having a function representing various types of information items. Each of the site demand schedule information 105 or the facility operation information 106 is updated at intervals equal to or less than the unit time. In addition, the multi-site integrated management subsystem 100 may include an input device for receiving input from a manager of the multi-site integrated management subsystem 100.

The site management subsystem 200 includes the demand facility 201 that consumes or generates energy, such as an air conditioning facility, a power generation facility, a storage facility, or a production facility and a facility monitoring control device 202 (a control device) that monitors the operation state of the demand facility 201 and controls the demand facility 201 based on the information sent from the multi-site integrated management subsystem 100. The facility monitoring control device 202 is, for example, a computer, and includes a memory storing a program and data, and a processor for executing a process according to the program.

The facility monitoring control device 202 stores demand schedule information 204 transmitted from the multi-site integrated management subsystem 100 and a monitoring control program 203 that monitors and controls the demand facility 201 based on the demand schedule information 204.

The facility monitoring control device 202 may generate the demand schedule information 204 and transmit the generated information to the multi-site integrated management device 101, and the multi-site integrated management device 101 may receive the demand schedule information and store the received information as the site demand schedule information 105. In addition, the multi-site integrated management device 101 may generate the site demand schedule information 105 and transmit the generated information to the facility monitoring control device 202, and the facility monitoring control device 202 may receive the site demand schedule information and store the received information as the demand schedule information 204.

The site management subsystem 200 may include a display device 210 having a function representing various types of information items. In order to grasp an achievement situation of the same amount of time of the power consumption, the facility monitoring control device 202 may display a relationship between the total power consumption within the site until the current time in the current unit time frame and the schedule value on the display device 210.

Hereinafter, in the multi-site integrated management device 101 or the facility monitoring control device 202, an operation of the processor based on the program will be described as an operation of the program, in some cases.

FIG. 2 illustrates information stored in the multi-site integrated management device 101.

The site demand schedule information 105 indicates information on the schedule value of the total power consumption for each unit time frame of each site and the information on breakdown of the total power consumption for each facility. The facility operation information 106 is the information on a performance of the power consumption for each unit time frame of the facility owned by each site and includes items similar to the site demand schedule information 105. Facility information 107 is information on a schedule changeable facility (an adjustment facility) and a schedule changeable amount of the facility. The schedule changeable facility is a facility that can be responded to a schedule change among the facilities owned by each site.

The schedule changeable facility is, for example, a storage battery capable of controlling charging and discharging at an arbitrary timing, a work process (a production line) in which the working time can be easily changed, and the like. The schedule changeable amount is, for example, a capacity or a charge amount of a storage battery, the power consumption amount of the work process, and the like. The site state information 108 indicates information on a control mode which is the state of each site. For example, the site state information 108 represents the control mode of the site where the demand is operating under the schedule value as a normal control mode, the demand is likely to exceed the schedule value, and represents a control mode of the site in a state such as air conditioning or illumination being forcibly stopped by the facility monitoring control device 202, as a forced control mode.

Hereinafter, an operation of the multi-site integrated management device 101 of the multi-site integrated management subsystem 100 will be described.

FIG. 3 illustrates a demand schedule management process by the demand schedule management program 103.

The demand schedule management program 103 periodically selects each of the plurality of sites as a target site at a predetermined time interval and implements the demand schedule management process of the target site. In process S1031, the demand schedule management program 103 executes a demand prediction process for predicting the total power consumption of the target site using a method such as a physical model and regression analysis for each unit time frame after the next unit time frame for the target site. In process S1032, the demand schedule management program 103 optimizes a peak of the power consumption of the target site, an energy procurement cost, and the like by using the result of the demand prediction process and the facility information 107 on the owned facility such as the storage battery and the production facility to generate the operation schedule for each facility within the target site, calculates the schedule value of the total electric power consumption for each unit time frame of the target site based on the operation schedule, and generates the demand schedule information including the operation schedule and the schedule value. In process S1033, the demand schedule management program 103 holds the generated demand schedule information on the site demand schedule information 105. In process S1034, the demand schedule management program 103 transmits the demand schedule information to the facility monitoring control device 202 of the target site and ends the flow.

FIG. 4 illustrates an outline of the adjustment process within the unit time frame.

The overall demand management program 102 ends two adjustment processes within one unit time frame using a demand adjustment site selection program 104 and the demand schedule management program 103. Two adjustment processes are a current frame adjustment process for adjusting the demand schedule information of the unit time frame (the current frame and a first time frame) including a current time and a next frame adjustment process for adjusting demand schedule information of a next unit time frame (the next frame and a second time frame). The overall demand management program 102 executes the current frame adjustment process and the next frame adjustment process at an arbitrary timing within the unit time frame.

FIG. 5 illustrates the current frame adjustment process.

Here, the current frame is set as the target frame for changing the demand schedule information. In process S1110, the overall demand management program 102 collects the demand schedule information of the target frames of entire sites from the site demand schedule information 105, calculates the total demand amount of the target frame (the total power consumption of entire sites) in process S1120, and determines whether the total demand amount exceeds the target value of the target frame. The target value may be input in advance by the manager or may be received from the other system via the communication network 300.

In a case where there is no excess, the overall demand management program 102 ends the current frame adjustment process.

In process S1130, in a case where there is excess, the overall demand management program 102 calculates the target value excess amount which is a difference obtained by subtracting the target value from the total demand amount and transmits the target value excess amount to the demand adjustment site selection program 104. In process S1140, the demand adjustment site selection program 104 executes a demand schedule changing site selection process to select a site where the demand schedule information is changed as a change site. In process S1150, the demand adjustment site selection program 104 transmits the identifier and the target value excess amount of the change site to the demand schedule management program 103. In process S1160, the demand schedule management program 103 executes a demand schedule changing process to be described on the change site and changes the demand schedule information such that the target value excess amount becomes the smallest. In process S1170, the demand schedule management program 103 transmits the changed demand schedule information and the target value excess amount updated according to the changed demand schedule information to the demand adjustment site selection program 104. In process S1180, the demand adjustment site selection program 104 selects the change site sequentially until the target value excess amount becomes 0 and calls up the demand schedule management program 103. After the current frame adjustment process is completed, the overall demand management program 102 executes the next frame adjustment process.

FIG. 6 illustrates the next frame adjustment process.

Here, the next frame is set as the target frame for changing the demand schedule information. When compared with the current frame adjustment process, the next frame adjustment process is the same process flow as that of the current frame adjustment process except that the target frame is different. The total demand amount in the current frame adjustment process corresponds to a first total schedule value. In addition, the total demand amount in the next frame adjustment process corresponds to a second total schedule value. The change site in the current frame adjustment process corresponds to a first site. In addition, the change site in the next frame adjustment process corresponds to a second site.

In the current unit time frame, the multi-site integrated management device 101 changes the demand schedule information before the next unit time frame by performing not only the current frame adjustment process but also the next frame adjustment process, and can reduce the target value excess amount. According to this, a processing time of the current frame adjustment process in the next unit time frame can be shortened. The multi-site integrated management device 101 may execute only the current frame adjustment process within the current frame. However, when the number of sites increases, in a case of executing the current frame adjustment process and the next frame adjustment process within the current frame, it is possible to reduce the calculation amount compared to the case where only the current frame adjustment process is executed within the current frame. According to this, the multi-site integrated management device 101 can complete the calculation within each of frames.

At each of sites, the demand schedule changing process targeting a certain unit time frame is performed at most once. That is, in the current frame adjustment process, the change site is selected from the sites other than the change site selected by the next frame adjustment process within the preceding unit time frame.

FIG. 7 illustrates a demand adjustment site selection process by the demand adjustment site selection program 104.

In process S1041, the demand adjustment site selection program 104 refers to the site state information 108 and extracts to the site satisfying the candidate criterion as the candidate site group. For example, the candidate criterion is that the control mode of the site is not in the forced control mode, and the site is not selected as the change site of the target frame (the demand schedule information of the site in the target frame is not changed). In process S1042, the demand adjustment site selection program 104 refers to the facility information 107, and selects a site having the maximum power adjustment capability from among the candidate site group as the change site. The power adjustment capability of the site is the sum of the schedule changeable amount of all of the facilities within the site. For example, the site having the greatest storage battery capacity is selected as the change site. In process S1043, the demand adjustment site selection program 104 transmits the target value excess amount of the target frame and information indicating the change site to the demand schedule management program 103 to cause the demand schedule management program 103 to execute the demand schedule changing process. In process S1044, the demand adjustment site selection program 104 receives the change result of the demand schedule information and the changed target value excess amount from the demand schedule management program 103. In process S1045, when the target value excess amount is 0 or less, the demand adjustment site selection program 104 ends the selection of the change site and transmits the result to the overall demand management program 102. In process S1045, when the target value excess amount exceeds 0, the demand adjustment site selection program 104 shifts to process S1042 excluding the change site from the candidate site group, and selects the next change site from the candidate site group. According to this, the demand adjustment site selection program 104 repeats processes S1042 to S1044 until the target value becomes 0 or less.

By changing the demand schedule information in order from the site having the great power adjustment capability, it is possible to minimize the number of sites changing the demand schedule information. According to this, a processing amount of the multi-site integrated management device 101 can be reduced. In addition, by repeating the selection of the change site and the processes until the target value exceeding amount of the demand schedule information of the change site becomes 0 or less, it is possible to minimize the number of sites for changing the demand schedule information. In addition, the multi-site integrated management device 101 can improve the accuracy of change of the demand schedule information by excluding the site in the forced control mode from the candidate site group. In addition, the multi-site integrated management device 101 can suppress a plurality of changes to the demand schedule information at one site, and can suppress the amount of calculation by excluding the site selected as the change site of the target frame from among the candidate site group.

FIG. 8 illustrates the demand schedule changing process.

In process S701, the demand schedule management program 103 predicts the total power consumption (a first site prediction value) of the demand facility such as air conditioning, lighting, a production facility, and the like with respect to the change site within the target frame. Here, the demand schedule management program 103 calculates a prediction value of the total power consumption by using a prediction method using a physical model and a correlation analysis method using an operation history such as facility operation information. In process S702, the demand schedule management program 103 multiplies the preset objective function and the target value excess amount to the total power consumption predicted in the process S701 by a preset weighting coefficient and combines the resultant, performs optimization calculation as a new objective function, plans the operation schedule of the schedule changeable facility (freely controllable demand facility), and calculates the schedule value. The objective function is, for example, a charge and discharge schedule of the storage battery and a work process change schedule of the production line. For example, the demand schedule management program 103 sets the peak value of the total power consumption as the objective function and plans the charge and discharge schedule of the storage battery minimizing the objective function as the operation schedule. In addition, for example, the demand schedule management program 103 sets the burden on an operator and the peak value of the total power consumption as objective functions, reduces the peak value of the total power consumption while reducing the burden on the operator, and plans the work process change schedule of the production line as the operation schedule. The weighting coefficient is set in advance for each of sites and indicates, for example, whether to emphasize the burden on the operator or to emphasize the peak value (cost) of the total power consumption.

According to the above-described demand schedule changing process, the demand schedule management program 103 selects a part of the site as a change site instead of optimizing all of the sites, and optimizes only the changed site, whereby suppressing the calculation amount. In addition, by executing the demand schedule changing process by the multi-site integrated management device 101, the site management subsystem 200 does not need to have a function of changing the demand schedule information.

The multi-site integrated management device 101 may display the demand schedule information changed in the demand schedule changing process and the demand schedule information before changing on the display device 110. According to this, the manager can compare the demand schedule information after changing and the demand schedule information before changing.

Hereinafter, an operation of the facility monitoring control device 202 in the site management subsystem 200 will be described.

FIG. 9 illustrates the power consumption monitoring process by the monitoring control program 203.

In process S2031, a monitoring control program 203 calculates the total power consumption of the site from a current frame start time to the current time by measuring the power consumption of the demand facility 201 within a local site. In process S2032, the monitoring control program 203 predicts the total power consumption of the site of the current frame (from the current frame start time to the current frame end time). In the prediction, a regression analysis is performed from the transition of the total power consumption of the site from the current frame start time to the current time, and the total power consumption of the site in the current frame is calculated from the obtained model. In process S2033, the monitoring control program 203 determines whether the prediction value of the total power consumption of the site of the current frame is equal to or less than the schedule value of the demand schedule information 204.

In process S2034, in a case where the prediction value is equal to or less than the schedule value, the monitoring control program 203 determines whether the current time has reached the unit time frame end time, and in a case where the current time has not reached the unit time frame end time, the process proceeds to process S2031. If the current time has reached the unit time frame end time, the monitoring control program 203 ends the process.

In process S2035, in a case where the prediction value exceeds the schedule value, the monitoring control program 203 notifies the multi-site integrated management subsystem 100 of that the control mode of the demand facility 201 within the site is shifted to the forced control mode. In process S2036, the monitoring control program 203 controls the demand facility 201 in the forced control mode (a control process). For example, the monitoring control program 203 in the forced control mode executes a forced control according to a rule set in advance such as forcibly stopping the air conditioning facility with low priority and discharging the storage battery regardless of the demand schedule information 204 as long as the storage battery is provided and is dischargeable. According to this, by reducing the power consumption of the site, an increase in the total power consumption of the site in the current frame is suppressed. In process S2037, the monitoring control program 203 ends the process if the current time is the unit time frame end time, and otherwise, the process proceeds to process S2036.

According to the above-described power consumption monitoring process, in a case where the prediction value of the total power consumption of the site of the current frame exceeds the schedule value of the demand schedule information 204, the facility monitoring control device 202 controls the facility and can suppress an increase in the total power consumption.

The monitoring control program 203 performs the power consumption monitoring process and controls the demand facility 201 according to the operation schedule such as the charge and discharge schedule of the storage battery and the operation schedule of the production facility on the demand schedule information 204.

Example 2

In Example 2, a case where, in the demand schedule changing site selection process, the demand adjustment site selection program 104 selects a site where the process time of the schedule change is short as a change site will be described. In the present example, a different point from Example 1 will be described.

FIG. 10 illustrates an example of the facility information 107 in Example 2.

The facility information 107 of the present example includes information on the facility of the site and a schedule planning process time indicating a process time required for generating the demand schedule of the site for each of sites. The schedule planning process time is the time required for process S1031 and process S1032 of the above-described demand schedule management process. The demand schedule management program 103 updates the schedule planning process time every time when the demand schedule management process is executed.

FIG. 11 illustrates the demand schedule changing site selection process in Example 2.

When comparing with the demand schedule changing site selection process in Example 1, in the demand schedule changing site selection process of the present example, process S1046 is executed instead of process S1042. Processes S1041, S1043, S1044, and S1045 are same as that of Example 1.

In Process S1046, the demand adjustment site selection program 104 refers to the facility information 107 and selects a site where the schedule planning process time is the shortest as the change site. According to this, it is possible to reduce the calculation time and the calculation amount required for the demand schedule adjustment process and the multi-site integrated management device 101 can manage the more sites.

Example 3

In Example 3, a case where, in the demand schedule changing site selection process, the demand adjustment site selection program 104 selects a site with high schedule execution accuracy as the change site will be described. In the present example, a different point from Example 1 will be described.

FIG. 12 illustrates an example of the facility information 107 in Example 3.

The facility information 107 of the present example includes information on the facility of the site and information indicating a schedule execution accuracy of the demand schedule information of the site for each of sites. For example, the schedule execution accuracy is a ratio of the result value in facility operation information to the schedule value in the demand schedule information. The demand schedule management program 103 updates the schedule execution accuracy from the result value and the schedule value every unit time frame. The schedule execution accuracy may be based on the difference between the schedule value and the result value (the magnitude of the error of the result value relative to the schedule value). In this case, the schedule execution accuracy becomes higher as the difference is small. In addition, the schedule execution accuracy may be a ratio of the unit time frame in which the forced control mode does not occur among unit time frames within a past predetermined period. For example, in a case where the site includes a photovoltaics (PV) generator, if the weather changes in a certain unit time frame, the total power consumption exceeds the schedule value, the control mode of the site becomes the forced control mode, and the schedule execution accuracy is lowered.

FIG. 13 illustrates the demand schedule changing site selection process in Example 3.

When comparing with the demand schedule changing site selection process in Example 1, in the demand schedule changing site selection process of the present example, process S1047 is executed instead of process S1042. Processes S1041, S1043, S1044, and S1045 are same as that of Example 1.

In process S1047, the demand adjustment site selection program 104 refers to the facility information 107 and selects a site with the highest schedule execution accuracy as the change site. According to this, after changing the demand schedule, the frequency of occurrence of re-scheduling due to the departure of the demand prediction is suppressed and the burden increase of the adjustment process can be suppressed. According to this, the multi-site integrated management device 101 can manage more sites.

Example 4

In Example 4, a case where, in the demand schedule changing site selection process, the demand adjustment site selection program 104 selects a site having a computer for planning the schedule as the change site will be described. In the present example, a different point from Example 1 will be described.

FIG. 14 illustrates a configuration of the multi-site integrated energy management system in Example 4.

When comparing with Example 1, the multi-site integrated energy management system of the present example includes a site management subsystem 200b instead of at least one of the site management subsystems 200. The site management subsystem 200b includes a schedule planning device 205 (a site computer) in addition to an element of the site management subsystem 200. The schedule planning device 205 stores the demand schedule management program 103 same as the demand schedule management program 103 of the multi-site integrated management device 101 and executes the program. The multi-site integrated energy management system of the present example includes the site management subsystem 200b including the schedule planning device 205 and the site management subsystem 200 without the schedule planning device 205.

FIG. 15 illustrates an example of the facility information 107 in Example 4.

The facility information 107 of the present example includes information on a facility of the site and information indicating whether the site has the schedule planning device 205 for each of sites.

FIG. 16 illustrates the demand schedule changing site selection process in Example 4.

When comparing with the demand schedule changing site selection process in Example 1, in the demand schedule changing site selection process of the present example, process S1048 is executed instead of process S1042. Processes S1041, S1043, S1044, and S1045 are the same as Example 1.

In process S1048, the demand adjustment site selection program 104 refers to the facility information 107 and preferentially selects a site having the schedule planning device 205 as the change site.

In S1150 to S1180 of the current frame adjustment process or the next frame adjustment process of the present example, the demand adjustment site selection program 104 of the multi-site integrated management device 101 transmits the identifier and the target value excess amount of the change site to the demand schedule management program 103 of the schedule planning device 205 of the change site. The demand schedule management program 103 of the schedule planning device 205 executes the demand schedule changing process and transmits the changed demand schedule information and target value excess amount to the demand schedule management program 103 of the schedule planning device 205.

Since the schedule planning device 205 of the change site executes the demand schedule changing process by selecting the site including the schedule planning device 205 as the change site, a processing burden on the multi-site integrated management device 101 is reduced. According to this, the multi-site integrated management device 101 can manage more sites.

As described above, the multi-site integrated management device 101 may preferentially select, as the change site, a site having a small calculation amount of the multi-site integrated management device 101 and a site with a high execution accuracy of the demand schedule information 204 among the candidate site group. In addition, the multi-site integrated management device 101 may select the change site using a combination of these priorities. For example, the multi-site integrated management device 101 may select a site having the schedule planning device 205 as a candidate, and select the change site from the candidates in descending order of power adjustment capability.

According to the above examples, even in a case where the number of sites to be managed increases, it is possible to generate the operation schedule for each of sites satisfying an individual constraint for each of sites and overall constraints when overall sites are integrated, with a small amount of calculation.

The present invention is not limited to/by the above-described examples and embraces a variety of modifications. For example, the examples have only been described for a better understanding of the invention and are therefore not necessarily limited to the configurations containing all described constituent elements. In addition, part of the configuration of a certain example may be replaced by the configuration of another example and the configuration of a certain example may be added to the configuration of another example. Furthermore, part of the configuration of each example may be added to, deleted from, and/or replaced by the other examples. In addition, part or all of a configuration, a function, a processing unit, processing means, or the like may be embodied in hardware by means of, for example, designing using integrated circuits. Further, the above-described configuration, function, or the like may be embodied by software in which, for example, a processor interprets and executes a program which realizes the functions. Information of a program, a table, a file, and the like for realizing each function can be stored in a storage device such as a memory, a hard disk, and a solid state drive (SSD) or in a storage medium such as an IC card, an SD card, and a DVD.

In addition, the energy to be managed by the multi-site integrated energy management system may include gas, heat, or the like.

REFERENCE SIGNS LIST

100: multi-site integrated management subsystem
101: multi-site integrated management device
200, 200b: site management subsystem
201: demand facility
202: facility monitoring control device
205: schedule planning device
300: communication network

The invention claimed is:

1. An energy management system comprising:
a management computer; and
a plurality of control devices which are provided at a plurality of sites, respectively, and connected to the management computer via a communication network,
wherein the management computer is configured to:
store information on facility characteristics which is provided at one or more sites of the plurality of sites and which indicates characteristics of a facility group that demands energy,
determine a result value of a past demand energy amount of the facility group and a demand schedule including a schedule value of the demand energy amount of the facility group for each time frame of a preset length, for each of the sites,
calculate a first total schedule value, which is the total of the schedule values for each of the sites within a first time frame, responsive to determining that the first total schedule value exceeds a first target value set in advance,
calculate a first excess amount of the first total schedule value in relation to the first target value,
select, as a first site, a site subjected to a change in a demand schedule from a group of candidate sites satisfying a candidate criterion set in advance from among a plurality of the sites, the selection being performed on the basis of information on the facility characteristics for each of the sites,
preferentially select at least one of a site having a predetermined calculation amount associated with the management computer due to a change in the demand schedule or a site having a predetermined execution accuracy of the demand schedule among the candidate site groups,
change a first demand schedule of the first site within the first time frame, and transmit the changed first demand schedule to a control device of the first site,
change the first total schedule value, the first excess amount, and a candidate site group on the basis of the changed first demand schedule,
select another site from the changed candidate site group such that the first total schedule value does not exceed the first target value, and
change a demand schedule of the another site;
wherein the control device for each of sites is configured to:
store the demand schedule of the site within the first time frame, and
control a facility group within the site on the basis of the demand schedule of the site in the first time frame.

2. The energy management system according to claim 1, wherein the control device of each site is further configured to:
calculate a site prediction value that is a prediction value of the demand energy amount of the site within the first time frame,
determine whether the site prediction value exceeds the schedule value,
execute, in a case where it is determined that the site prediction value exceeds the schedule value, a control process for minimizing an increase in a demand energy amount of the site by controlling the facility group, and
notify the management computer of the control process.

3. The energy management system according to claim 2, wherein, in a case where the first total schedule value exceeds the first target value, the management computer is further configured to select the first site from the candidate site group excluding the site under control processing and a site where the demand schedule of the first time frame is changed among the plurality of sites.

4. The energy management system according to claim 3, wherein the management computer is further configured to:
calculate a second total schedule value, which is the total of the schedule value for each of the sites within a second time frame subsequent to the first time frame among the first time frame, responsive to determining that the second total schedule value exceeds a second target value set in advance,
calculate a second excess amount of the second total schedule value in relation to the second target value,
select, as a second site, a site subjected to a change in a demand schedule from a second group of candidate sites satisfying a candidate criterion from among a plurality of the sites, the selection being performed on the basis of information on the facility characteristics for each of the sites,
change a second demand schedule of the second site within the first time frame, and
transmit the changed second demand schedule to a control device of the second site.

5. The energy management system according to claim 1, wherein a control device of each of sites is configured to display a demand energy amount of the site until a current time among the first time frame and a schedule value of the site of the first time frame on a display device.

6. The energy management system according to claim 1, wherein the management computer is configured to display a first demand schedule of the first site within the first time frame and the changed first demand schedule on a display device.

7. The energy management system according to claim 1, wherein the management computer is further configured to:
calculate a first site prediction value that is a prediction value of the demand energy amount of the first site within the first time frame on the basis of the result value of the first site, and
change the first demand schedule within the first time frame on the basis of the first site prediction value and the first excess amount.

8. The energy management system according to claim 1, further comprising:
a site computer provided at a specific site among the plurality of sites and connected to the management computer via a communication network,
wherein the information on facility characteristics of the specific site indicates that the specific site has the site computer,
wherein, responsive to determining the first total schedule value exceeds the first target value, the management computer is further configured to:
select, as the first site, the specific site on the basis of the information on facility characteristics of each of the sites, and
transmit the first excess amount to the site computer;
wherein the site computer is configured to:
calculate the first site prediction value that is the prediction value of the demand energy amount of the first site within the first time frame on the basis of the result value of the first site,
change the first demand schedule within the first time frame on the basis of the first site prediction value and the first excess amount, and
transmit the changed first demand schedule to the management computer.

9. The energy management system according to claim 1, wherein the information on facility characteristics comprises an adjustment capability of the schedule value by an adjustment facility that is a facility which can adjust the schedule value among the facility group, and
wherein the management computer is further configured to select, as the first site, a site having maximum adjustment capability among the candidate site group.

10. The energy management system according to claim 1, wherein the information on facility characteristics comprises a processing time that is a time required for changing a demand schedule of a corresponding site in the past, and wherein the management computer is further configured to select, as the first site, a site corresponding to a minimum processing time among the candidate site group.

11. The energy management system according to claim 1, wherein the management computer is further configured to:

calculate a magnitude of an error in a result value in relation to a schedule value for each of sites, and select, as the first site, a site corresponding to the minimum magnitude of the error among the candidate site group.

12. An energy management method comprising:

storing, by a management computer, information on facility characteristics which is provided at a site and which indicates characteristics of a facility group that demands energy, a result value of a past demand energy amount of the facility group, and a demand schedule including a schedule value of the demand energy amount of the facility group for each time frame of a preset length, for each of a plurality of sites;

calculating, by the management computer, a first total schedule value, which is the total of the schedule values for each of the sites within a first time frame, responsive to determining the first total schedule value exceeds a first target value set in advance, and calculating, by the management computer, a first excess amount of the first total schedule value in relation to the first target value, selecting, by the management computer, as a first site, a site subjected to a change in a demand schedule from a group of candidate sites satisfying a candidate criterion set in advance from among a plurality of the sites, the selection being performed on the basis of information on the facility characteristics for each of the sites, preferentially selecting, by the management computer, at least one of a site having a predetermined calculation amount of the management computer due to a change in the demand schedule or a site having a predetermined execution accuracy of the demand schedule among the candidate sites, changing, by the management computer, a first demand schedule of the first site within the first time frame, transmitting, from the management computer, the changed first demand schedule to a control device of the first site, changing, by the management computer, the first total schedule value, the first excess amount, and the candidate site group on the basis of the changed first demand schedule, selecting, by the management computer, another site from the changed candidate site group such that the first total schedule value does not exceed the first target value, changing, by the management computer, the demand schedule of the another site, storing, by the control device for each of sites, the demand schedule of the site within the first time frame, and controlling, by the control device for each of the sites, a facility group within the site on the basis of the demand schedule of the site in the first time frame.

13. An energy management device comprising:

a storing device; and an operating device which is connected to a plurality of control devices provided at a plurality of sites, respectively via a communication network and is connected to the storing device, wherein the storing device is configured to:

store information on facility characteristics which is provided at the site and comprises characteristics of a facility group that demands energy, a result value of a past demand energy amount of the facility group, and a demand schedule including a schedule value of the demand energy amount of the facility group for each time frame of a preset length, for each of sites, wherein the operating device is configured to:

calculate a first total schedule value, which is the total of the schedule values for each of the sites within a first time frame, responsive to determining the first total schedule value exceeds a first target value set in advance, calculate a first excess amount of the first total schedule value in relation to the first target value, select, as a first site, a site subjected to a change in a demand schedule from a group of candidate sites satisfying a candidate criterion set in advance from among a plurality of the sites, the selection being performed on the basis of information on the facility characteristics for each of the sites and preferentially select at least one of a site having a predetermined calculation amount of the operating device due to a change in the demand schedule and a site having a predetermined execution accuracy of the demand schedule among the candidate site groups, change a demand schedule of the first site within the first time frame, transmit the changed demand schedule to a control device of the first site, change the first total schedule value, the first excess amount, and the candidate site group on the basis of the changed first demand schedule, select another site from the changed candidate site group such that the first total schedule value does not exceed the first target value, and change the demand schedule of the another site.

* * * * *